United States Patent [19]

Ishiguro et al.

[11] Patent Number: 5,260,542
[45] Date of Patent: Nov. 9, 1993

[54] LASER MARKING APPARATUS

[75] Inventors: Kouji Ishiguro; Minoru Fujimoto; Kiyoshi Okumura, all of Hitachi; Kiyoshi Saito, Katsuta; Kouji Kuwabara, Hitachi; Makoto Yano, Mito; Hiroo Ohkawa, Hitachi, all of Japan

[73] Assignee: Hitachi, Ltd., Tokyo, Japan

[21] Appl. No.: 800,262

[22] Filed: Nov. 29, 1991

[30] Foreign Application Priority Data

Nov. 30, 1990 [JP] Japan ................................ 2-340490
May 16, 1991 [JP] Japan ................................ 3-111735

[51] Int. Cl.⁵ ............................................. B23K 26/00
[52] U.S. Cl. ............................. 219/121.68; 219/121.69
[58] Field of Search ..................... 219/121.68, 121.69, 219/121.65, 121.66; 338/195

[56] References Cited

U.S. PATENT DOCUMENTS

| | | | |
|---|---|---|---|
| 4,128,752 | 12/1978 | Gravel | 219/121.68 |
| 4,734,558 | 3/1988 | Nakano et al. | 219/121.73 |
| 4,818,835 | 4/1989 | Kuwabara et al. | 219/121.6 |
| 5,157,235 | 10/1992 | Okumura et al. | 219/121.68 |

*Primary Examiner*—C. L. Albritton
*Attorney, Agent, or Firm*—Antonelli, Terry, Stout & Kraus

[57] ABSTRACT

A laser marking apparatus comprises a pulse laser oscillator which emits a linearly polarized laser beam; a transmission type liquid crystal mask which displays a pattern to be marked on an article in one of a positive pattern display mode and a negative pattern display mode by dots arranged in a matrix form and which allows to pass the emitted laser beam but differentiates the polarization plane of the laser beam which has passed through masked portions from that through unmasked portions; a polarized beam splitter disposed downstream the transmission type liquid crystal mask for selectivity passing the laser beam to be irradiated on the article to be marked from the transmission type liquid crystal mask; a TV camera for detecting a discriminator indicating the thermal conductivity of the article to be marked; a recognition unit which determines the thermal conductivity of the article to be marked based upon the detected discriminator; and a control unit which controls the transmission type liquid crystal mask to operate in one of the positive pattern display mode and the negative pattern display mode based upon the determined thermal conductivity of the article to be marked in such a manner that when the determined thermal conductivity of the article to be marked is low, the positive pattern display mode is selected and when the determined thermal conductivity of the article to be marked is high, the negative pattern display mode is selected.

9 Claims, 6 Drawing Sheets

LASER MARKING APPARATUS

BACKGROUND OF THE INVENTION

The present invention relates to a laser marking apparatus, and more particularly, to a one-shot laser marking apparatus which uses a transmission type liquid crystal mask of a matrix form as a pattern mask for marking.

A conventional laser marking apparatus which uses a transmission type liquid crystal mask of a matrix form as a pattern for marking is explained with reference to FIG. 1 through FIG. 6.

FIG. 1 is a schematic block diagram for explaining the conventional laser marking apparatus. In the drawing, a pulse laser oscillator 1 as represented by, for example, a YAG laser enables to emit a pulse laser beam having a wavelength within a wavelength range from visible light to near infrared light. A linearly polarized laser beam 2 emitted from the pulse laser oscillator 1 is expanded by an expander 3 which is formed by combining a concave and a convex cylindrical lenses and is irradiated onto a liquid crystal mask 4. The liquid crystal mask 4 is operated by a drive and control unit 5.

Now the structure of the liquid crystal mark 4 is explained with reference to FIG. 2 which shows a part of the cross section of the liquid crystal mask 4. On an upper glass plate 14 scanning electrodes 15 for dot matrix are disposed and formed and on a lower glass plate 18 signaling electrodes 17 for dot matrix are also disposed and formed in a direction orthogonal to that of the scanning electrodes 15. The surface of the scanning electrodes 15 and the signaling electrodes 17 is applied with an orientation treatment and liquid crystal 16 is sandwiched between the upper glass plate 14 and the lower glass plate 18 to constitute a transmission type liquid crystal cell serving as the liquid crystal mask 4 of a matrix form.

FIG. 3 is a plane view of a part of the liquid crystal mask 4 thus constituted seen from above the upper glass plate 14. As seen from the drawing on the liquid crystal mask 4 a multiplicity of crossing portions 61 forming dot portions and of non-cross portions 62 forming clearances between the dots are formed by the scanning electrodes 15 and the signaling electrodes 17 for dot matrix.

FIG. 4 is a view for explaining the operation of the liquid crystal mask 4 when a character to be marked on an article is laterally turned "U". As seen from the drawing, information or signal voltages for displaying the character on the liquid crystal mask 4 are applied only to the dots in the matrix indicated by hatching 80 from the drive and control unit 5 and no signal voltages are applied to the other dots, in that a positive mask pattern is applied. The plane of polarization of laser beam 6 which has passed through the portion applied with no signal voltage of the liquid crystal mask 4 is caused to rotate by 90° but the plane of polarization of the laser beam 6 which has passed the portion of the liquid crystal mask 4 applied with the signal voltage is caused no rotation because of the controlled optical property of the liquid crystal in this portion. A polarized beam splitter 7 is adapted to pass the laser beam 6 which has passed through the portion applied with the signal voltage as indicated by the hatching 80 in FIG. 4 and is adapted to reflect the laser beam 6 which has passed through the portion applied with no signal voltage. Laser beam 8 which has passed the polarized beam splitter 7 is reflected at a bend mirror 10, passes via a condenser lens 11 and is imaged on an article 12 to be marked to mark the character. Laser beam 9 which has been reflected at the polarized beam splitter 7 travels to an absorbing member 13 and is absorbed there.

FIG. 5 is a view for explaining heat diffusion of the laser beam 8 irradiated upon the article 12 to be marked and FIG. 6 is also a view for explaining the resultant marked area reduction due to the heat diffusion. As shown in FIG. 5 the heat caused by the irradiation of the laser beam 8 on the article 12 to be marked diffuses therein as indicated by allows 19, as a result, an effective marked area on the article 12 is reduced as indicated by hatched square areas 90 in FIG. 6 which is smaller than the actual laser beam irradiated area corresponding to the hatched area 80 in FIG. 4.

JP-A-64-11088(1989) of which corresponding U.S. Patent is U.S. Pat. No. 4,818,835 also discloses a laser marker similar to that explained above.

In the above conventional laser marking apparatus which uses a transmission type liquid crystal mask of a matrix form as a pattern mask for marking, no counter measured was taken for preventing diffusion of heat generated by irradiated laser beam toward the clearances between dots, such that effective marking area in a dot is reduced which results in non-sharp marking dots on the article to be marked, in particular on the article having a high heat conductivity.

SUMMARY OF THE INVENTION

An object of the present invention is to overcome the above conventional problems and is to provide a laser marking apparatus which uses a transmission type liquid crystal mask as a pattern mask for marking which enables a sharp marking on an article having a high thermal conductivity.

Another object of the present invention is to overcome the above problems and is to provide a laser marking apparatus which uses a transmission type liquid crystal mask as a pattern mask for marking which enables a sharp marking on both articles having high and low thermal conductivity.

In a laser marking apparatus of one aspect which uses a transmission type liquid crystal mask as a pattern mask for marking according to the present invention, no signal voltages are applied to the electrodes of the liquid crystal mask corresponding to the pattern to be displayed, in other words the pattern is displayed in a negative image, to maintain the same optical property as that in clearances between electrodes, as a result, the plane of polarization of the laser beam which has passed through the clearances is maintained as same as that has passed through the patterned electrode portion so that the laser beam which has passed through the clearances passes through the polarized beam splitter together with the laser beam which has passed through the patterned electrode portion to thereby irradiated the displayed pattern on the article to be marked without any clearances.

In a laser marking apparatus of another aspect which uses a transmission type liquid crystal mask as a pattern mask for marking according to the present invention, the display pattern on the liquid crystal mask is switched between a positive image pattern and a negative image pattern in response to thermal conductivity of the article to be marked and the polarization plane of the polarized beam splitter which defines the laser beam able to pass therethrough is also switched in response to the switching of the display pattern on the liquid crystal mask to thereby ensure a sharp marking on both articles having a high thermal conductivity and a low thermal conductivity.

In the first aspect of the present invention, the liquid crystal mask is driven in such a manner that the plane of polarization of the laser beam which has passed through the dot portions corresponding to a marking content, in other words to a marking character, is equalized to the plane of polarization of the laser beam which has passed through the clearance portions between dots and the polarized beam splitter has been set so as to pass the laser beam which has passed through the dot portions corresponding to the marking content such that the polarized beam splitter works to pass the laser beam which has passed through the clearance portions between dots so as to incorporate the same as a part of marking content. Namely, the polarized beam splitter takes out the laser beam which has passed through the clearance portions between dots as a marking content thereby the laser beam energy which has passed through the clearance portion between dots is effectively used to form the pattern on the article, thereby the thermal diffusion of the irradiated laser beam at the dotted portions on the article toward the clearance therebetween is suppressed and a sharp marking on the article is obtained.

However, when applying the laser marking apparatus of the first aspect of the present invention to an article having a low thermal conductivity, a grid pattern corresponding to all of the clearance portions on the liquid crystal mask may be formed on the article to be marked thereby to reduce the sharpness of the marked pattern because the thermal diffusion of the irradiated laser beam at the portions on the article corresponding to the clearances on the liquid crystal mask toward the portions not irradiated by the laser beam is insufficient.

With the laser marking apparatus of the second aspect of the present invention, the above possible problem of the laser marking apparatus according to the first aspect is overcome, in that the thermal conductivity of the article to be marked is for the first time determined, and based on the determination the display pattern on the liquid crystal mask, i.e. a positive image pattern or a negative image pattern, is selected, when the thermal conductivity of the article to be marked is low the positive image pattern is selected for the display pattern and when the thermal conductivity of the article is high, the negative image pattern is selected, and the polarized beam splitter is set to pass the laser beam which has passed the selected image pattern on the liquid crystal mask, and when the negative image pattern is selected the polarized beam splitter also passes the laser beam which has passed through the clearance portions between dots on the liquid crystal mask. Accordingly, with a single laser marking apparatus according to the present invention of the second aspect, articles of any thermal conductivities can be marked.

DETAILED EXPLANATION OF THE PREFERRED EMBODIMENTS

A first embodiment of the laser marking apparatus according to the present invention is explained with reference to FIG. 7 through FIG. 10. In these drawings, the same numerals as in FIG. 1 through FIG. 6 show the same or equivalent elements.

Differences of the firt embodiment from the conventional laser marking apparatus explained with referenced to FIG. 1 through FIG. 6 are that the display pattern on the liquid crystal mask 4 is inverted, in that in a negative image pattern, so as to equalize the optical property thereof with that of the clearance portions between dots on the liquid crystal mask 4 and the polarization plane of the polarized beam splitter 71 is rotated by 90° from the position of the polarized beam splitter in the conventional laser marking apparatus, in that the polarization plane of the polarized beam splitter 71 is set to pass the laser beam which has passed through the clearance portions between dots on the liquid crystal mask 4 as well as through the negative image pattern displayed portions.

An example when a character of laterally turned "U" is marked on the article to be marked is explained hereinbelow.

Figure 1:
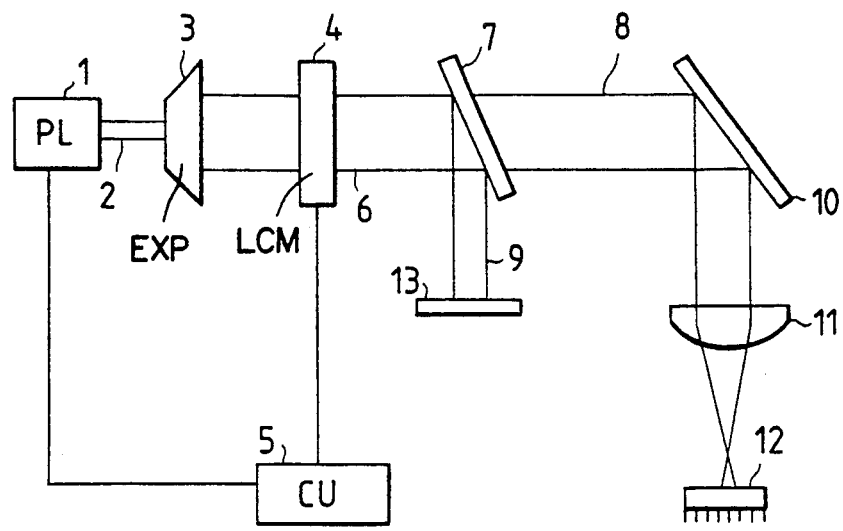
FIG. 1 is a schematic block diagram of a conventional laser marking apparatus and an article to be marked.
Figure 2:
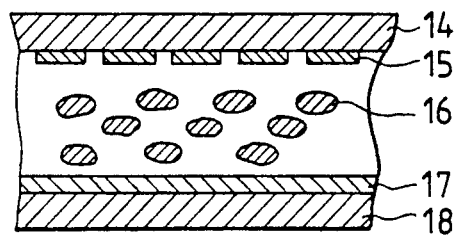
FIG. 2 is a part of the cross section of a liquid crystal mask used in the apparatus shown in FIG. 1.
Figure 3:
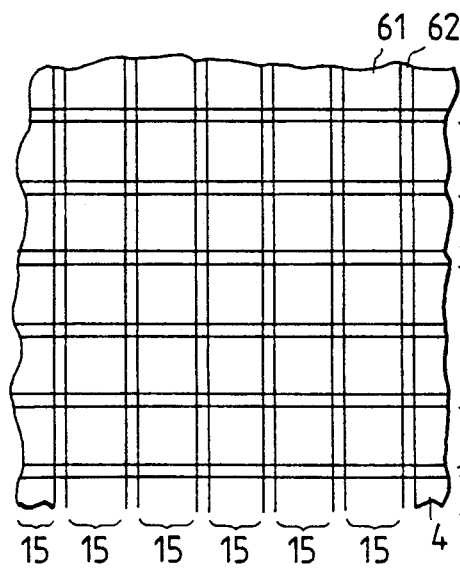
FIG. 3 is a part of the plan view of the liquid crystal mask shown in FIG. 2 seen from the above.
Figure 4:
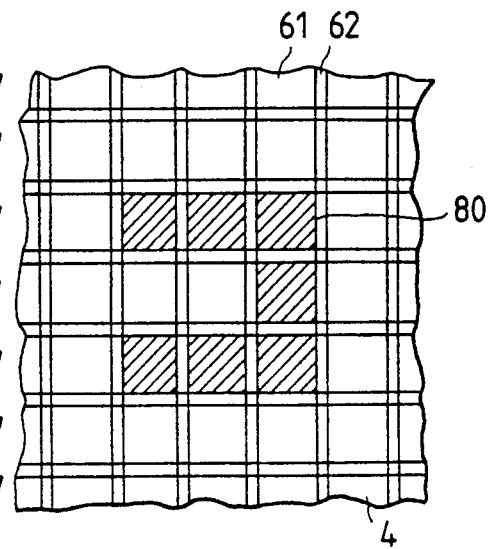
FIG. 4 is a view for explaining a conventional drive of the liquid crystal mask shown in FIG. 3 wherein a positive image pattern is displayed.
Figure 5:
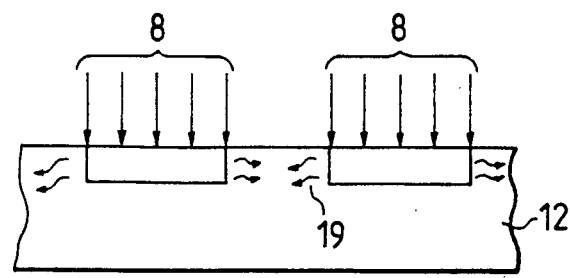
FIG. 5 is a view for explaining diffusion of heat generated by laser beam irradiation on the article to be marked shown in FIG. 1.
Figure 6:
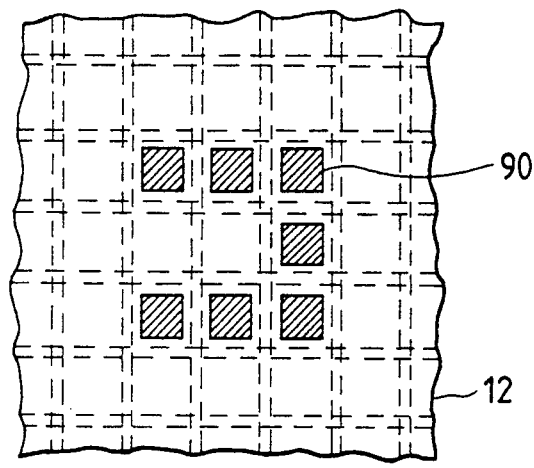
FIG. 6 is a view for explaining actual marked areas on the article to be marked corresponding to the displayed pattern on the liquid crystal mask illustrated in FIG. 4.
Figure 7:
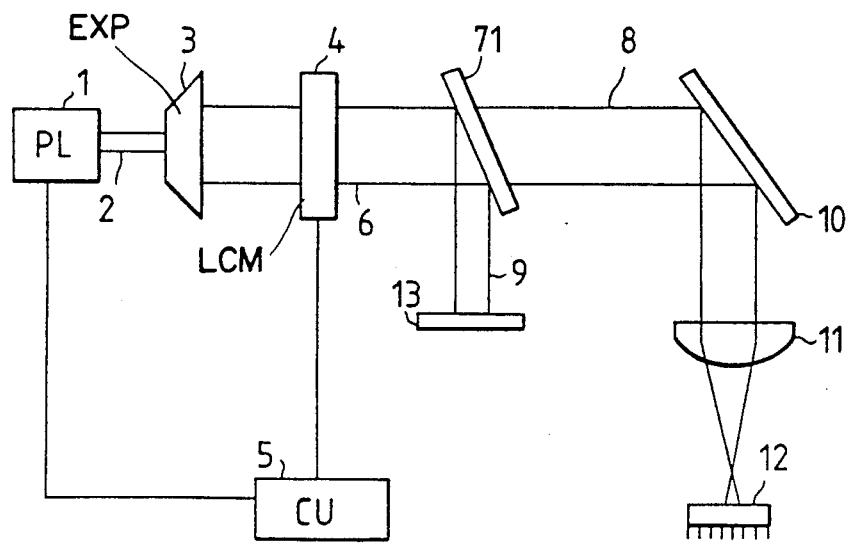
FIG. 7 is a schematic block diagram of one embodiment of the laser marking apparatus according to the present invention and an article to be marked.
Figure 8:
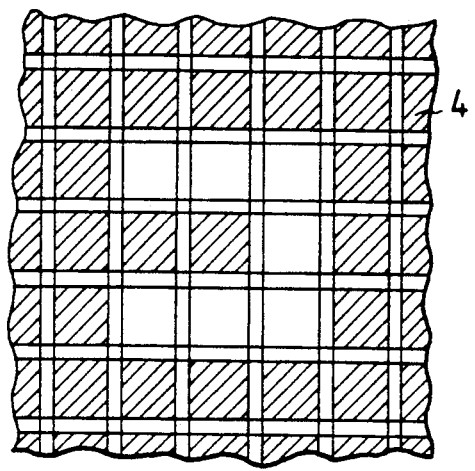
FIG. 8 is a view for explaining a drive of the liquid crystal mask shown in FIG. 7 according to the one embodiment of the present invention wherein a negative image pattern is displayed.

A signal voltage is applied to the respective electrodes or dots on the liquid crystal mask 4 as indicated by matching in FIG. 8, in that for displaying the same character the electrodes or dots on the liquid crystal mask 4 to which the signal voltage is applied are inverted from those shown in FIG. 4. As a result, the polarization plane of the laser beam which has passed through the dot portions on the liquid crystal mask corresponding to the marking pattern is equalized to the polarization plane of the laser beam which has passed through the clearance portions between electrodes or dots on the liquid crystal mask 4.

Figure 9:
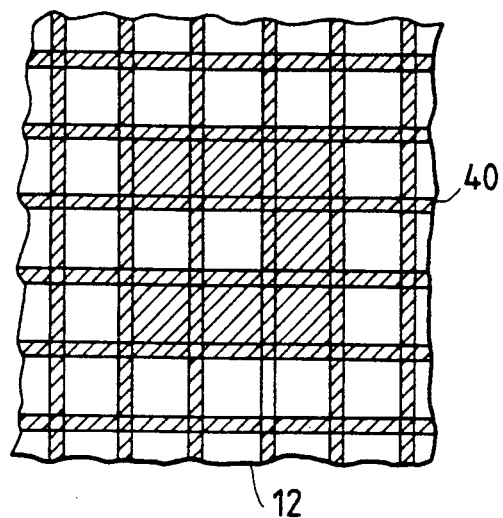
FIG. 9 is a view for explaining laser beam irradiated portions on the article to be marked when the displayed pattern on the liquid crystal mask illustrated in FIG. 8 is used.

Since the polarized beam splitter 71 is set to pass both the laser beam which has passed through the electrode portions reflecting the marking pattern and the clearance portions between electrodes on the liquid crystal mask 4, the laser beam irradiates the portions on the article 12 to be marked as indicated by hatching 40 in FIG. 9.

Figure 10:
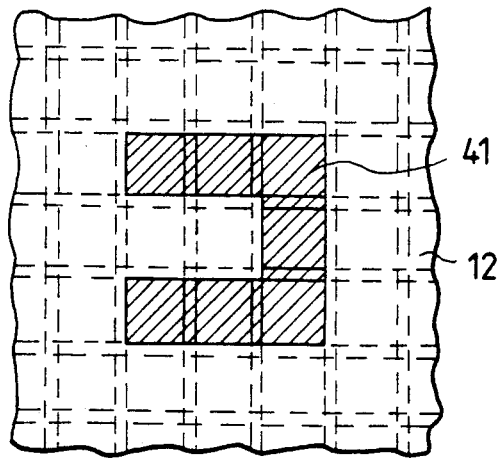
FIG. 10 is a view for explaining actual marked areas on the article to be marked corresponding to the laser beam irradiated portions illustrated in FIG. 9.
Figure 11:
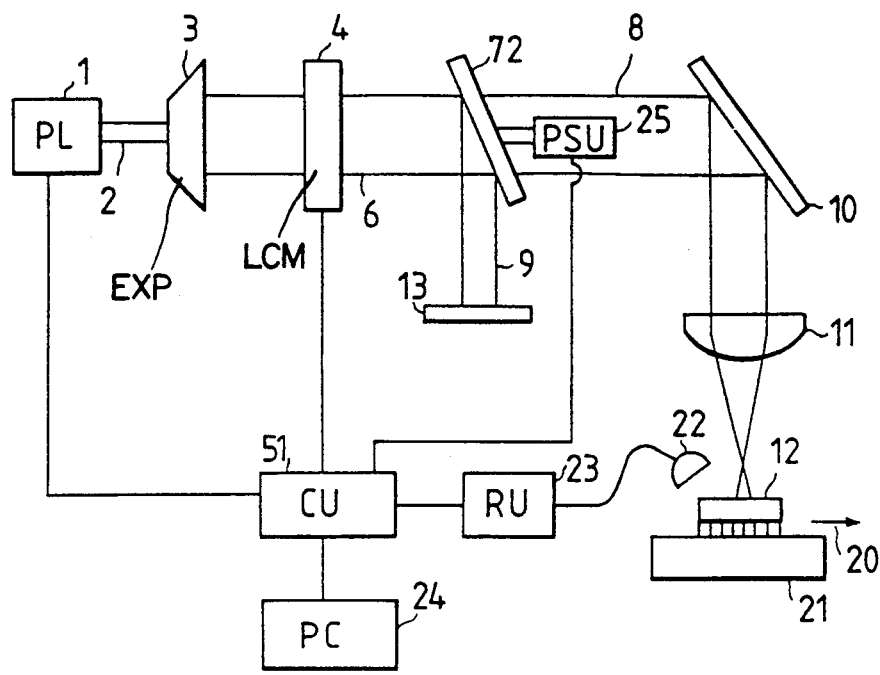
FIG. 11 is a schematic block diagram of another embodiment of the laser marking apparatus according to the present invention an an article to be marked.

Now, a visible pattern or character appearing on the article 12 is explained with reference to FIG. 10. Since the portions on the article surface to be marked corresponding to the clearance portions between electrodes on the liquid crystal mask 4 is also irradiated by the laser beam, the heat diffusion from the irradiated dot portions toward the clearance portions is suppressed, thereby the reduction of effective marking areas on the article to be marked is prevented. On the other hand, the heat generated by the irradiated laser beam on the clearance portions between non-irradiated dot portions on the article to be marked diffuses toward the non-irradiated dot portions so that no mark appears on the corresponding clearance portions and even if slight changes appear on the clearance portions of the article to be marked such is invisibly fine. As a result a sharp visible character with no clearance as indicated by hatching 41 in FIG. 10 is obtained, and the sharpness of the marked character of the present embodiment is equivalent to that marked by a hard mask type marking apparatus.

The above first embodiment according to the present invention is particularly suitable for an article having a high thermal conductivity, for example 0.010 w/cm °C., such as a material for IC having a high thermal conductivity. However, when a material having a low thermal conductivity, for example 0.007 w/cm°C., such as a paper for printing and a material for IC having a low thermal conductivity is marked with the first embodiment of the present invention, the heat generated by the irradiated laser beam on the clearance portions between non-irradiated dot portions on the article to be marked does not diffused sufficiently toward the non-irradiated dot portions so that the pattern indicated in FIG. 9 may appear on article surface such that the sharpness of the pattern or character to be marked is reduced because the contrast between the marked character and the background thereof is reduced.

A second embodiment of the laser marking apparatus according to the present invention which overcomes the above the problems and is applicable to both articles having a high thermal conductivity and a low thermal conductivity is explained with reference to FIG. 11 through FIG. 15, where like numerals refer to like parts. The laser marking apparatus of the second embodiment is also a one-shot laser marking apparatus using a transmission type mask of a matrix form as marking pattern mask and is constituted by beam emitting means including the pulse laser oscillator 1 and the expander 3, a transmission type mask such as the liquid crystal mask 4 capable of displaying thereon a pattern or character to be marked on the article 12 in a positive or negative image pattern, an optical arrangement including such as polarization element 72, the bend mirror 10 and the condenser lens 11 which allows to pass only a predetermined laser beam out of the laser beam which has passed through the liquid crystal mask 4, a control arrangement including such as a visual sensor 22, a recognition unit 23 and a liquid crystal mask control unit 51 which detects information on the article 12 to be marked relating to its thermal conductivity and controls the respective parts based upon the detection, and an input means such as a personal computer 24 which provides signals corresponding to patterns or characters to be displayed on the liquid crystal mask 4 and to be finally marked on the article 12.

In the control arrangement, the visual sensor 22 such as a TV camera reads information relating to the thermal conductivity of the article 12 to be marked, the recognition unit 23 such as a picture image recognition unit determines whether the positive image pattern or a negative image pattern be displayed based upon the information read by the visual sensor 22 and the liquid crystal mask control unit 51 controls the signal voltage to be applied to the liquid crystal mask 4 in response to the decision of the recognition unit 23 as well as controls a polarization plane selecting arrangement 25 so as to select and set one of two polarization planes of the polarization element 72 such as a polarized beam splitter and further controls the output from the pulse laser oscillator 1. Namely, this control arrangement is composed of control means which selects an image pattern display mode on the transmission type liquid crystal mask as well as selects one polarization plane of the polarization element 72 which only passes laser beam to be irradiated on the article to be marked, and discrimination means for discriminating the article 12 to be marked depending upon its thermal conductivity.

Figure 12:
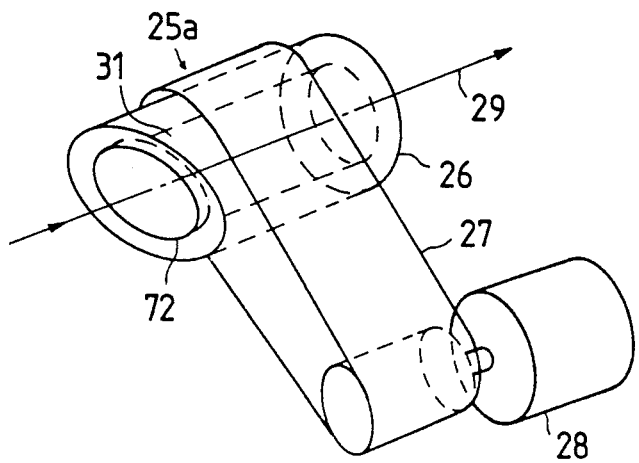
FIG. 12 is a perspective view of one example of the polarization plane selecting arrangement incorporated in the embodiment shown in FIG. 11.
Figure 13:
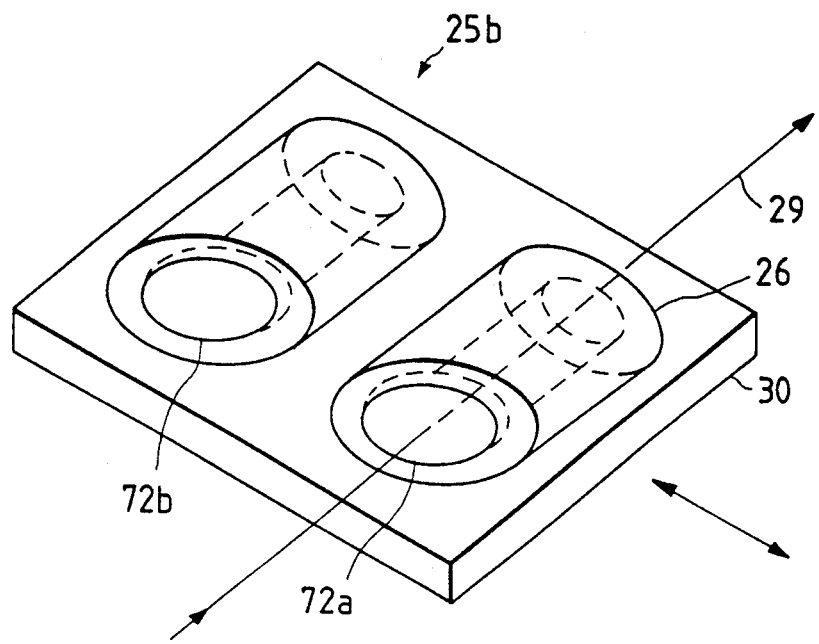
FIG. 13 is a perspective view of another example of the polarization plane selecting arrangement incorporated in the embodiment shown in FIG. 11.

Now, two examples of the polarization plane selection arrangement 25 for the polarization element 72 are explained with reference to FIG. 12 and FIG. 13. FIG. 12 is a perspective view showing a polarization plane selecting arrangement 25a which selects one of two polarization planes of the polarization element 72 by rotating thereof. Further, FIG. 13 is a perspective view showing a polarization plane selecting arrangement 25b which selects one of two polarization planes by sliding a table 30 on which two polarization elements 72a and 72b are disposed of which polarization planes arranged orthogonal to each other. Either of the polarization plane selecting arrangements 25a and 25b can be incorporated in the second embodiment of the present invention. The polarization plane selecting arrangement 25 serves to rotate the polarization plane of the polarization element 72 by 90° around the laser beam axis 29 when the pattern display mode on the liquid crystal mask 4 is changed, for instance when the pattern display mode is changed from the positive image display mode to the negative image display mode the polarization plane of the polarization element 72 is set by the rotation to permit the laser beam which has passed through the electrode portions corresponding to the displayed pattern and through the clearances between electrodes to pass therethrough.

In the polarization plane selecting arrangement 25a, the polarization element 74 is fixed by a holder 26 having a space 31 therein permitting passage of laser beam and the holder 26 is adapted to rotate by 90° by means of a motor 28 such as a stepping motor via a belt 27.

In the polarization plane selecting arrangement 25b, two polarization elements 72a and 72b are disposed on the table 30 and the polarization plane of the polarization element 72a is set to pass the laser beam which has passed through the positive image display pattern on the liquid crystal mask 4 and the polarization plane of the polarization element 72b is set to pass the laser beam which has passed through the negative image display pattern, and depending upon selection of the positive image display mode and the negative image display mode one of the corresponding polarization elements 722 and 72b is moved onto the laser beam axis 29.

Figure 14:
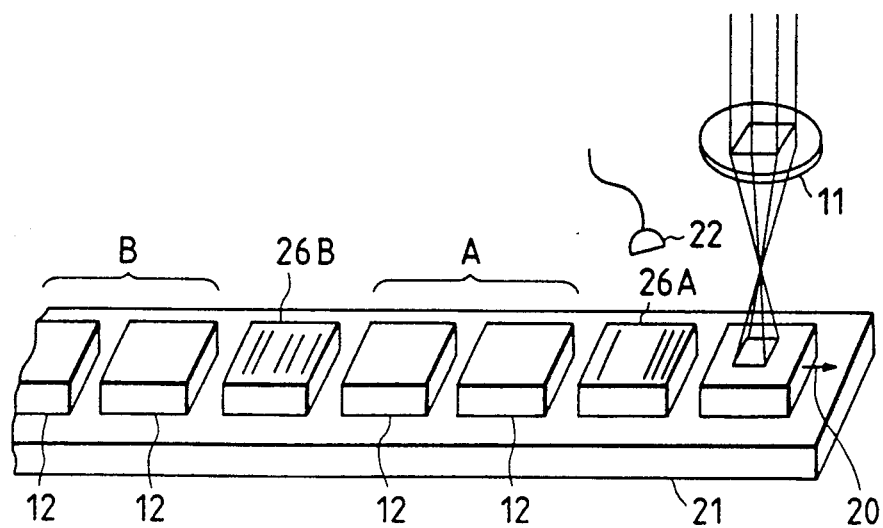
FIG. 14 is a perspective view for explaining marking operation with the embodiment shown in FIG. 11 on articles having different thermal conductivities carried successively by a conveyor.

Now, a marking operation onto the article 12 to be marked by making use of the present embodiment is explained with reference to FIG. 14 wherein information relating to the thermal conductivity of the article 12 to be marked is indicated by a bar code.

At first, a pattern such as characters to be marked on the article 12 are inputted to the personal computer 24 via its keyboard. Then the signals outputted from the personal computer 24 corresponding to such as the characters are inputted to the liquid crystal mask control unit 51. On the other hand, a conveyor 21 which moves in a conveying direction 20 carries a group A of articles 12 to be marked which are to be marked via the positive image display mode of the liquid crystal mask 4, a group B of articles 12 to be marked which are to be marked via the negative image display mode of the liquid crystal mask 4, a bar code 26A which is placed at the top of the group A indicating that the articles 12 in the group A are to be marked via the positive imae display mode and a bar code 26B which is placed at the top of the group B indicating that the articles 12 in the group B are to be marked via the negative image display mode. The information contained in the bar codes 26A and 26B is read by the visual sensor 22 and is judged by the recognition unit 23 whether the positive image display mode or the negative image display mode is required. The result of the judgment is inputted into the liquid crystal mask control unit 51. The signals outputted from the liquid crystal mask control unit 51 are inputted to the liquid crystal mask 4 as well as to the polarized plane selecting arrangement 25 where the polarization plane of the polarization element 72 is selected.

Subsequently, a linearly polarized pulse laser beam 2 is emitted from the pulse laser oscillator 1 and the pulse laser beam 2 is expanded at the expander 3. The polarization element 72 such as a polarized beam splitter permits the laser beam having a predetermined polarization plane which is determined by the displayed pattern on the liquid crystal mask 4 to pass therethrough among the laser beam 6 which has passed through the liquid crystal mask 4 and to form the laser beam 8 which is thereafter reflected by the bend mirror 10. The reflected laser beam 8 passes through the condenser lens 11 and is imaged on the article 12 to be marked to complete marking. On the other hand, the laser beam having a polarization plane other than the predetermined polarization plane is separated and reflected by the polarization element 72 to form the laser beam 9 directing to the absorbing member 13 where the laser beam 9 is absorbed.

A single laser marking apparatus according to the present embodiment can properly mark different kinds of articles having different thermal conductivities by selecting one of the positive image display mode and the negative image display mode to be displayed on the liquid crystal mask 4 based upon the thermal conductivity of the article to be marked.

Figure 15:
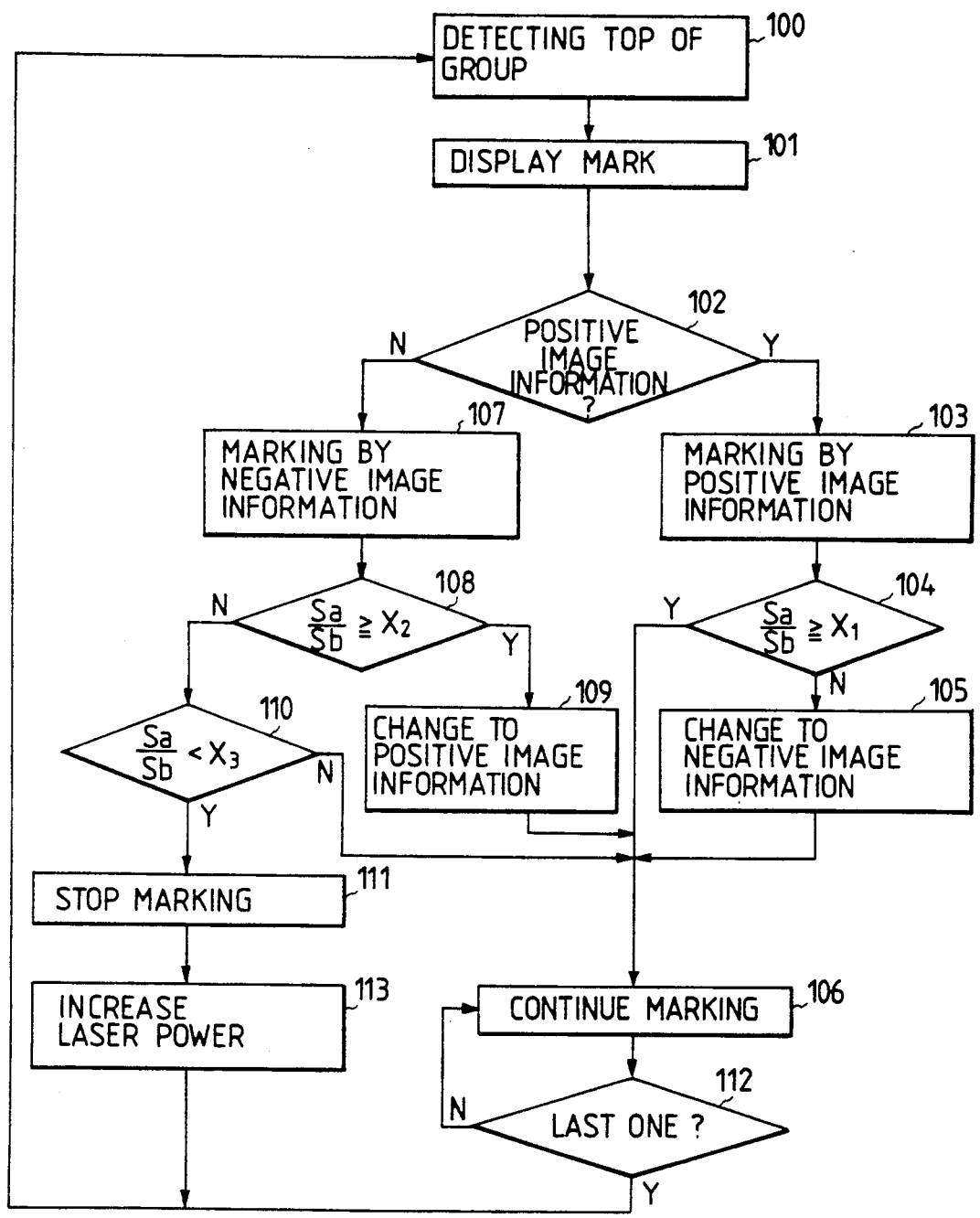
FIG. 15 is a flowchart showing the steps of determining thermal conductivity of the articles to be marked and carried successively, selecting display pattern on the liquid crystal mask and completing an appropriate marking thereon which may be used in the embodiment shown in FIG. 11.

Hereinafter, a method of marking the article 12 to be marked without using the bar code information is explained with reference to a flowchart shown in FIG. 15 and which method is suitable when many articles 12 having a same thermal conductivity are successively conveyed to a marking station.

At first, arrival of the top article to be marked in the same group where the articles of the same material are contained is detected in step 100. Then a pattern or character to be marked on the article 12 is displayed on the liquid crystal mask 4 in step 101, in this instance image display mode on the liquid crystal mask 4 is not limited. In step 102 whether or not the positive image display mode is used in the liquid crystal mask 4 is determined. When the determination is YES, the marking operation on the article 12 to be marked is performed with the positive image display mode as it is in step 103, and in step 104 the area Sa on the marking surface of the article 12 which has suffered color change by the marking operation and the area Sb which has not suffered color change are detected by making use of the visual sensor 22 to obtain the quotient Sa/Sb and the quotient Sa/Sb is compared with a predetermined first reference value $X_1$ judging a desirable marking result when the positive image display pattern is used which has been determined by experiments. When $Sa/Sb \geq X_1$, the marking operation is continued with the positive image display mode in step 106. When the comparison result in step 104 is NO, the operation mode of the liquid crystal mask is changed to the negative image display mode in step 105, and the marking operation is continued with the negative image display mode in step 106. In step 112 it is judged whether the article to be marked is the last one, and when the judgment is NO, the marking operation continues and when the judgment is YES, the process returns to the initial condition.

When the judgment in step 102 is NO, the marking operation on the article 12 to be marked is performed with the negative image display mode as it is in step 107, and in step 108 the area Sa on the marking surface of the article to be marked which has suffered color change by the marking operation and the area Sb which has not suffered color change are detected by making use of the visual sensor 22 to obtain the quotient Sa/Sb and the quotient Sa/Sb is compared with a predetermined second reference value $X_2$ judging whether or not the laser beam which has passed through the clearances between the signal voltage applied electrodes causes the color change of the article surface and which value has been determined by experiments. When $Sa/Sb \geq X_2$, the operation mode of the liquid crystal mask 4 is changed to the positive image display mode in step 109, and the marking operation is continued with the positive image display mode in step 106. When the comparison result in step 108 is NO, the quotient Sa/Sb is compared with a predetermined third reference value $X_3$ judging a desirable marking result when the negative image display pattern is used which has been determined by experiments in step 110. When the comparison result is NO, the marking operation is continued with the negative image display mode in step 106. On the other hand, when $Sa/Sb < X_3$, the marking operation is stopped in step 111 and thereafter the output power of the laser pulse oscillator 1 is increased by a predetermined amount in step 113 and the process returns to the initial condition to repeat the same steps.

With the method explained above it is unnecessary to previously provide information relating to thermal conductivity of the articles to be marked, however 50% of the top articles of respective groups are improperly marked.

Further, data providing an association of such as shape, size and color of the respective articles to be marked with image display modes to be used on the liquid crystal mask 4 may be stored beforehand in the liquid crystal mask control unit 51 via the personal computer 24 and after identifying such as shape, size and color of a specific article to be marked by making use of the visual sensor 22 such as the TV camera and the recognition unit 23 such as the picture image recognition unit, the liquid crystal mask control unit 51 may determined an image display mode to be displayed on the liquid crystal mask 4 based upon the stored data providing the association.

We claim:

1. A laser marking apparatus comprising:
   a pulse laser oscillator emitting a linearly polarized laser beam;
   an expander expanding the laser beam received from said pulse laser oscillator;
   a transmission type mask which displays a pattern to be marked on an article in one of a positive pattern display mode and a negative pattern display mode, and allows to pass the expanded laser beam but differentiates the polarization plane of the laser beam which has passed through masked portions from that through unmasked portions;
   a polarization element downstream said transmission type mask for selectively passing the laser beam from said transmission type mask having a predetermined polarization plane to be irradiated on the article to be marked;
   means for discriminating the thermal conductivity of the article to be marked; and
   a control unit for selecting a pattern display mode between the positive pattern display mode and the negative pattern display mode of said transmission type mask based on the discriminated thermal conductivity of the article to be marked in such a manner that when the discriminated thermal conductivity of the article to be marked is low, the positive pattern display mode is selected and when the discriminated thermal conductivity of the article to be masked is high, the negative pattern display mode is selected, said control unit further selects the polarization plane of said polarization element which allows to pass the laser beam having the predetermined polarization plane to be irradiated on the article to be marked based upon the selected pattern display mode of said transmission type mask.

2. A laser marking apparatus according to claim 1, wherein said transmission type mask is a transmission type liquid crystal mask in which the pattern to be marked on the article is displayed by dots defined by electrodes arranged in a matrix form.

3. A laser marking apparatus according to claim 2, wherein said control unit controls to set polarization plane of said polarization element so as to pass the laser beam which has passed through the clearances between the matrixed electrodes as well as through the electrodes displaying the pattern, when said control unit selected the negative pattern display mode.

4. A laser marking apparatus according to claim 1, wherein said polarization element is a polarized beam splitter.

5. A laser marking apparatus according to claim 1, wherein said discriminating means includes a visual sensor for detecting a discriminator indicating the thermal conductivity of the article to be marked and a recognition unit for determining the thermal conductivity of the article to be marked based upon the detected discriminator.

6. A laser marking apparatus according to claim 1, wherein said discriminating means discriminates the thermal conductivity of the article to be marked after detecting the initial marking result on the article to be marked.

7. A laser marking apparatus according to claim 1, further comprising an input unit for inputting signals corresponding to the pattern to be marked into said control unit.

8. A method of laser marking on a plurality of articles, wherein a linearly polarized laser beam is emitted onto a transmission type mask which displays a pattern to be marked on the articles, and allows to pass the emitted laser beam but differentiates the polarization plane which has passed through masked portions thereof from that through unmasked portions, and a polarization element which only allows to pass the laser beam from the transmission type mask having a predetermined polarization plane to be irradiated on the articles to be marked comprising the steps of:
   displaying a pattern to be marked on the articles in one of a positive display pattern and a negative display pattern on the transmission type mask;
   performing marking on the first article in a plurality of the articles in accordance with the display pattern on the transmission type mask;
   detecting ratio of changed color area on the surface of the first article caused by the marking;
   comparing the detected ratio with a predetermined value which has been determined in relation to the display pattern used; and
   determining which display pattern between the positive display pattern and the negative display pattern is to be used for the following articles to be marked based upon the comparison result.

9. A method of laser marking on a plurality of articles according to claim 8, further comprising the step of:
   increasing poutput power of the linearly polarized laser beam to be emitted onto the transmission type mask when the ratio of changed color area is below a predetermined value.

* * * * *